United States Patent
Takenaka et al.

(10) Patent No.: US 6,334,883 B1
(45) Date of Patent: Jan. 1, 2002

(54) PELLETS INCORPORATED WITH CARBONACEOUS MATERIAL AND METHOD OF PRODUCING REDUCED IRON

(75) Inventors: Yoshimichi Takenaka; Shoji Shirouchi; Masakata Shimizu; Kazuya Miyagawa, all of Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/444,824

(22) Filed: Nov. 22, 1999

(30) Foreign Application Priority Data

Nov. 24, 1998 (JP) .......................................... 10-332518

(51) Int. Cl.[7] ................................................ C22B 1/14
(52) U.S. Cl. ............................. 75/319; 75/320; 75/746
(58) Field of Search ........................... 75/319, 320, 746

(56) References Cited

U.S. PATENT DOCUMENTS

| | | | |
|---|---|---|---|
| 3,443,931 A | 5/1969 | Beggs et al. | |
| 3,489,549 A | 1/1970 | Jomoto et al. | |
| 4,202,734 A | * 5/1980 | Greenbaum | 201/6 |
| 4,549,904 A | * 10/1985 | Matsumiya et al. | 75/320 |
| 4,701,214 A | 10/1987 | Kaneko et al. | |
| 5,885,328 A | * 3/1999 | Markarian et al. | 75/770 |
| 5,922,261 A | * 7/1999 | Ford, Jr. | 264/122 |
| 6,063,156 A | 5/2000 | Negami et al. | |
| 6,149,709 A | 11/2000 | Uragami et al. | |
| 6,241,803 B1 | 6/2001 | Fuji | |

FOREIGN PATENT DOCUMENTS

| | | |
|---|---|---|
| DE | 31 39 375 | 4/1983 |
| DE | 33 07 175 | 9/1983 |
| EP | 0 916 742 | 5/1999 |
| GB | 1 305 727 | 2/1973 |
| GB | 2 172 586 | 9/1986 |
| JP | 06065579 A | * 3/1994 |

OTHER PUBLICATIONS

Derwent–Acc–No. 1994–115418 for JP 06065579 A, published Mar. 8, 1994, Abstract.*
Japanese Abstract of JP 54146803 A, published Nov. 16, 1979, Izawa et al.*
Patent Abstracts of Japan, vol. 1999, No. 8, Jun. 30, 1999, JP 11 071610 A, Mar. 16, 1999.
Patent Abstracts of Japan, vol. 9, No. 211 (C–300), Aug. 29, 1985, JP 60 075527 A, Apr. 27, 1985.
Patent Abstracts of Japan, vol. 18, No. 443 (C–1239), Aug. 18, 1994, JP 06 136365 A, May 17, 1994.
Patent Abstracts of Japan, vol. 12, No. 103 (C–485), Apr. 5, 1988, JP 62 230912 A, Oct. 9, 1987.

* cited by examiner

*Primary Examiner*—Roy King
*Assistant Examiner*—Tima McGuthry-Banks
(74) *Attorney, Agent, or Firm*—Oblon, Spivak, McClelland, Maier & Neustadt, P.C.

(57) ABSTRACT

Pellets incorporated with a carbonaceous material of the present invention contain a carbonaceous material and iron ore mainly composed of iron oxide. The maximum fluidity of the carbonaceous material in softening and melting, and the ratio of iron oxide particles of 10 $\mu$m or smaller in the iron ore are within the range above a line which connects in turn points A, B and C shown in FIG. 1, including the line. This permits the production of pellets incorporated with a carbonaceous material having excellent thermal conductivity and high strength. Reduction of the pellets incorporated with a carbonaceous material produces reduced iron having high strength after reduction and a low fines ratio with improved productivity.

10 Claims, 4 Drawing Sheets

PELLETS INCORPORATED WITH CARBONACEOUS MATERIAL AND METHOD OF PRODUCING REDUCED IRON

BACKGROUND OF THE INVENTION

1. Field of the Invention

The present invention relates to pellets incorporated with a carbonaceous material and a method of producing reduced iron using the same.

2. Description of the Related Art

As a method of producing reduced iron, a MIDREX method is well known, in which a reducing gas obtained by degenerating natural gas is blown into a shaft furnace through tuyeres, and moved upward in the shaft furnace so that iron ore or iron oxide pellets filled in the furnace are reduced to obtain reduced iron. However, this method requires the supply of a large amount of natural gas expensive as fuel.

Therefore, a process for producing reduced iron using relatively inexpensive coal as a reducing agent in place of natural gas has recently attracted attention. For example, U.S. Pat. No. 3,448,981 discloses a process for producing reduced iron comprising heating and reducing pellets incorporated with a carbonaceous material, which are obtained by pelletizing a mixture of fine ore and a carbonaceous material in an atmosphere of high temperature. This process has the advantages that coal is used as the reducing agent, fine ore can be used directly, high-rate reduction is possible, the carbon content in a product can be adjusted, etc.

In this process, the pellets incorporated with the carbonaceous material are heated by radiant heat from the upper side of a high-temperature reducing furnace, and thus the height of the pellet layer is limited. Therefore, in order to improve productivity, it is necessary to increase the reaction rate of reduction. However, since the reduction rate of the pellets is controlled by heat transfer within the pellets, when the temperature of the reducing furnace is increased to the heat transfer limit of the pellets or more in order to improve productivity, the pellets incorporated with the carbonaceous material are melted from the surfaces thereof to cause the problems of sticking in the furnace, and damage to the furnace body. The pellets incorporated with the carbonaceous material include pellets formed by pelletizing a mixture of raw materials such as fine ore, a carbonaceous material such as coal or the like serving as the reducing agent, and a binder, by using a pelletizer or a molding machine. In this case, the formed pellets incorporated with the carbonaceous material are porous, and have a small area of contact between the carbonaceous material and the fine ore, low thermal conductivity, and a low reduction rate.

SUMMARY OF THE INVENTION

Accordingly, an object of the present invention is to provide pellets incorporated with a carbonaceous material, which are capable of promoting reduction reaction of iron oxide, and which exhibit excellent strength after reduction, and a method of producing reduced iron using the pellets incorporated with a carbonaceous material with high productivity.

The pellets incorporated with a carbonaceous material of the present invention comprise a carbonaceous material and iron ore mainly composed of iron oxide, wherein combinations of the maximum fluidity of the carbonaceous material in softening and melting and the ratio of iron oxide particles of 10 $\mu$m or smaller in the iron ore are within the range above a line which connects points A, B and C shown in FIG. 1, including the line. Point A shown in FIG. 1 is a point where the maximum fluidity is 0, and the ratio of iron oxide particles of 10 $\mu$m or smaller in iron ore is 15% by mass; point B shown in FIG. 1 is a point where the maximum fluidity is 0.5, and the ratio of iron oxide particles of 10 $\mu$m or smaller in iron ore is 1% by mass; point C shown in FIG. 1 is a point where the maximum fluidity is 5, and the ratio of iron oxide particles of 10 $\mu$m or smaller in iron ore is 1% by mass.

In this case, it is possible to promote reduction reaction of iron oxide, and obtain the pellets incorporated with the carbonaceous material exhibiting excellent strength after reduction.

In the present invention, the maximum fluidity is a value which is represented by logDDPM, and obtained by measurement using a Gieseler Plastometer, as defined by JIS M8801. The iron oxide particles of 10 $\mu$m or smaller in iron ore are measured by a wet laser diffraction method.

In the present invention, the carbonaceous material represents a carbon-containing material such as coal, coke, petroleum coke, pitch, tar, or the like, and any carbonaceous material which satisfies the above-described relation between the maximum fluidity of the carbonaceous material in softening and melting, and the ratio of iron oxide particles of 10 $\mu$m or smaller in iron ore can be used. The carbonaceous material may be a single material or a mixture of a plurality of materials, and the iron ore may be a single type or a mixture of a plurality of types.

The pellets incorporated with the carbonaceous material have excellent thermal conductivity, and thus the use of the pellets can realize improvement in productivity of the production of reduced iron.

DESCRIPTION OF THE PREFERRED EMBODIMENT

A carbonaceous material as a reducing agent is softened and melted by the start of carbonization at 260° C. or more, and is solidified at 550° C. or more according to the type of carbon. In this temperature region, the melted carbonaceous material readily enters the spaces between iron oxide particles to strongly bond the iron oxide particles. This bonding structure of iron ore by the carbonaceous material increases the area of contact between the iron oxide particles and the carbonaceous material in pellets, improving the thermal conductivity in the pellets incorporated with the carbonaceous material.

Although the amount of the carbonaceous material mixed may be an amount necessary for reducing iron ore according to the type of the iron ore and the type of carbon used, the amount is generally about 10 to 30% by mass based on the raw material iron ore. The carbonaceous material may be single or a mixture of a plurality of materials. The maximum fluidity is a weight average.

In the present invention, with the carbonaceous material having a maximum fluidity in softening and melting of 0, the thermal conductivity in the pellets incorporated with the carbonaceous material can be improved by adjusting the ratio of iron oxide particles of 10 $\mu$m or smaller in iron ore. Namely, by decreasing the particle size of the iron ore, the number of contacts between the iron oxide particles is increased to increase the are of contact between the iron oxide particles, improving thermal conductivity in the pellets incorporated with carbonaceous material even when the maximum fluidity of the carbonaceous material is low in softening and melting. The iron oxide particles of 10 $\mu$m or smaller in the iron ore increase the number of bonding contacts between the iron oxide particles metallized by heating and reduction to promote sintering, thereby increasing strength after reduction, obtaining reduced iron with a low fines ratio represented by a ratio of fines of 6 mm or smaller.

An increase in the area of contact between the carbonaceous material and the iron ore also has the function to promote direct reduction with the carbonaceous material. Furthermore, since the iron oxide particles are strongly bonded, the CO partial pressure in the pellets can be increased, promoting gaseous reduction with CO of the iron ore.

In the present invention, the optimum particle size of iron ore according to the maximum fluidity of the carbonaceous material in softening and melting, particularly the amount of the iron ore particles of 10 $\mu$m or smaller, is defined so that even when coarse iron ore is used as a raw material, part of the iron ore is ground and the mixed, or a required amount of another fine iron ore is mixed to control the ratio of iron ore particles of 10 $\mu$m or smaller after mixing, permitting the achievement of the object of the invention.

Figure 1:
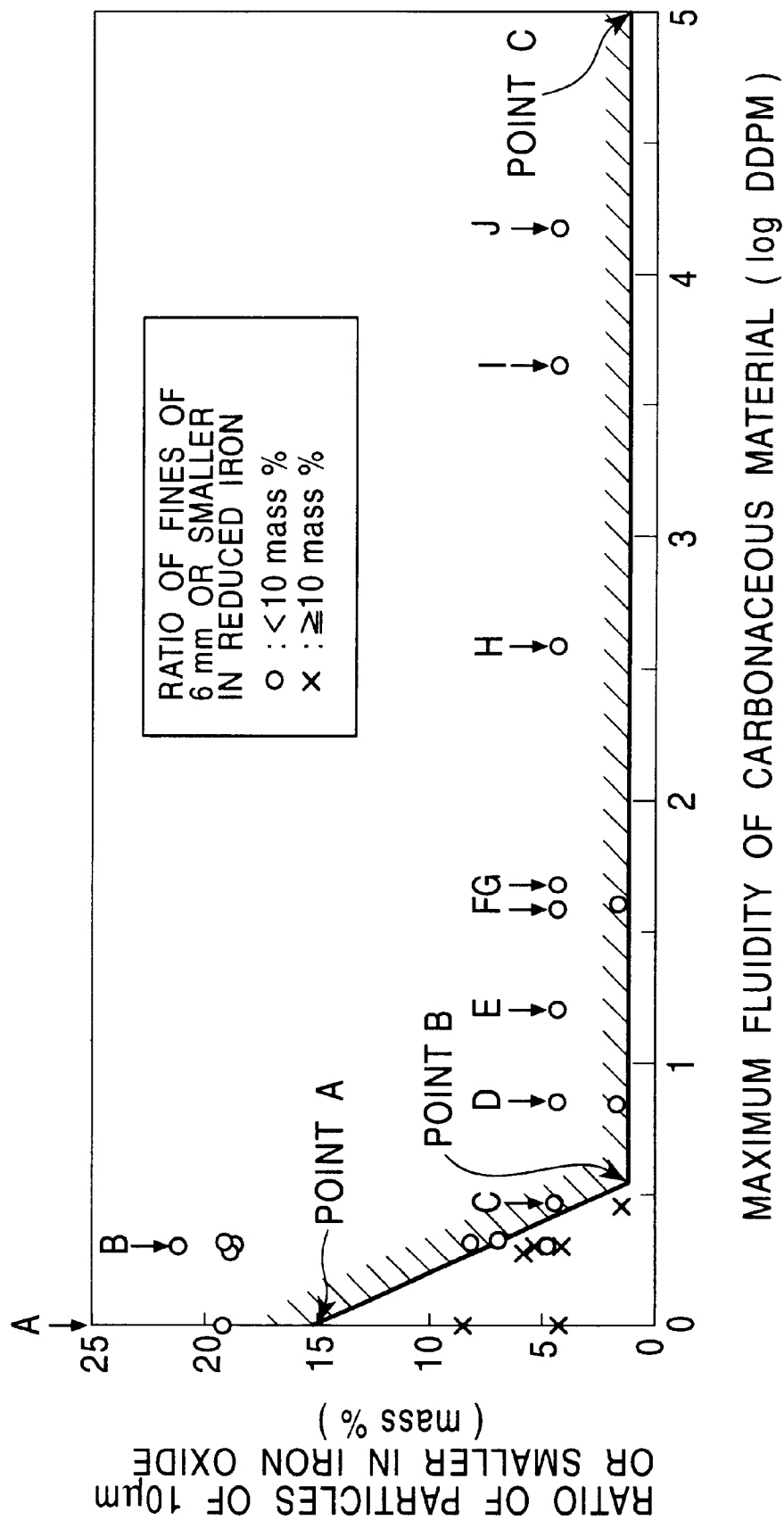
FIG. 1 is a graph showing a range of combinations of the maximum fluidity of a carbonaceous material in softening and melting and the ratio of iron oxide particles of 10 $\mu$m or smaller in iron ore in order that the ratio of fines of 6 mm or smaller in reduced iron is 10% by mass or less in accordance with the present invention.

FIG. 1 shows a range of combinations of the maximum fluidity of the carbonaceous material in softening and melting, and the ratio of iron oxide particles of 10 $\mu$m or smaller in iron ore in order that the ratio of fines of 6 mm or smaller in reduced iron is 10% by mass or less. In the range above a line which connects in turn points A, B and C shown in FIG. 1, including the line, the above object can be achieved.

In the use of coke or petroleum coke without fluidity as the carbonaceous material, the ratio of particles of 10 $\mu$m or smaller in the iron ore may be adjusted to 15% by mass or more (corresponding to point A shown in FIG. 1). In the present invention, even with the carbonaceous material having no fluidity in softening and melting, the thermal conductivity in the pellets incorporated with the carbonaceous material can be improved by adjusting the ratio of iron oxide particles of 10 $\mu$m or smaller in iron ore. Namely, by decreasing the particle size of iron ore, the number of contacts between the iron oxide particles is increased to increase the area of contact between the iron oxide particles, improving the thermal conductivity in the pellets incorporated with the carbonaceous material even when the maximum fluidity of the carbonaceous material in softening and melting is low. In addition, the iron oxide particles of 10 $\mu$m or smaller in iron ore increase the number of bonding contacts between the particles metallized by heat reduction to promote sintering, thereby increasing strength of reduced iron, obtaining reduced iron with a low fines ratio represented by the ratio of fines of 6 mm or smaller.

As the maximum fluidity of the carbonaceous material in softening and melting is increased, the ratio of iron oxide particles of 10 $\mu$m or smaller in iron ore can be linearly decreased. With the carbonaceous material having a maximum fluidity of 0.5 in softening and melting, the ratio of iron oxide particles of 10 $\mu$m or smaller may be 1% by mass or more (corresponding to point B shown in FIG. 1). Even with the carbonaceous material having a maximum fluidity of 0.5 or more in softening and melting, or a maximum fluidity of 5 (corresponding to point C shown in FIG. 1), the ratio of iron oxide particles of 10 $\mu$m or smaller is preferably 1% by mass or more. Because with substantially no particle of 10 $\mu$m or smaller in the iron ore, the iron ore particles are significantly coarsened to decrease the number of contacts between the respective iron oxide particles, decreasing the thermal conductivity in the pellets, and causing the danger of decreasing the strength of reduced iron after reduction.

The carbonaceous material having a maximum fluidity of 0.3 in softening and melting, and iron ore containing iron oxide particles of 10 $\mu$m or smaller at each of ratios of 1.7% by mass, 4.3% by mass, and 19.0% by mass were used to form three types of pellets incorporated with the carbonaceous material and having a diameter of 17 mm. The thus-formed pellets were charged in an atmosphere of 1300° C., and the rate of temperature rising in the central portions of the pellets was examined. The results are shown in FIG. 4.

Figure 4:
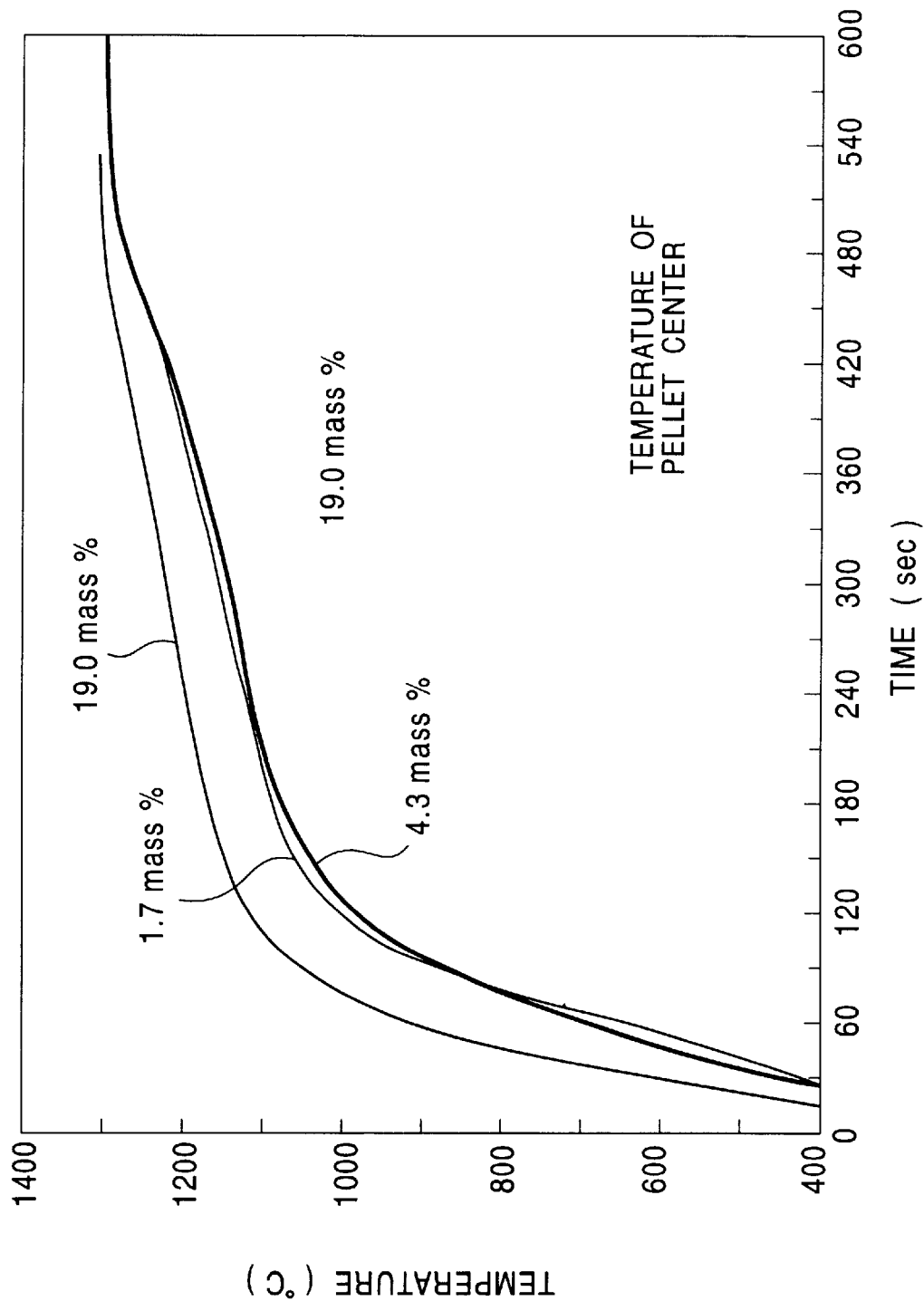
FIG. 4 is a graph showing the relation between the rate of temperature rising of the central portions of pellets and the ratio of iron oxide particles of 10 $\mu$m or smaller in iron ore.

FIG. 4 indicates that as the ratio of iron oxide particles of 10 $\mu$m or smaller in iron ore increases, the time required until the central portions of the pellets reach 1300° C. decreases. This is due to the fact that as described above, a decrease in the particle size of iron ore increases the number of contacts between the respective iron oxide particles to secure bonding between the respective iron oxide particles even when the maximum fluidity of the carbonaceous material in softening and melting is low, thereby improving the thermal conductivity in the pellets incorporated with the carbonaceous material.

EXAMPLES

The present invention will be described below with reference to examples.

Example 1

Ten types (A to J) of coal having different maximum fluidities shown in Table 1 were used as carbonaceous materials, and ten types (a to j) of iron ore having different ratios of iron oxide particles of 10 $\mu$m or smaller shown in Table 2 were used to produce pellets incorporated with each of the carbonaceous materials and having a diameter of 17 mm. The composition of the thus-produced pellets incorporated with each of the carbonaceous materials comprised 100 parts of iron ore having an iron content of 67 to 70% by mass, 25 to 27 parts of single coal or a mixture of two types of coal, and 1 part of bentonite and 0.1 part of organic binder both of which were used as a binder.

Figure 2:
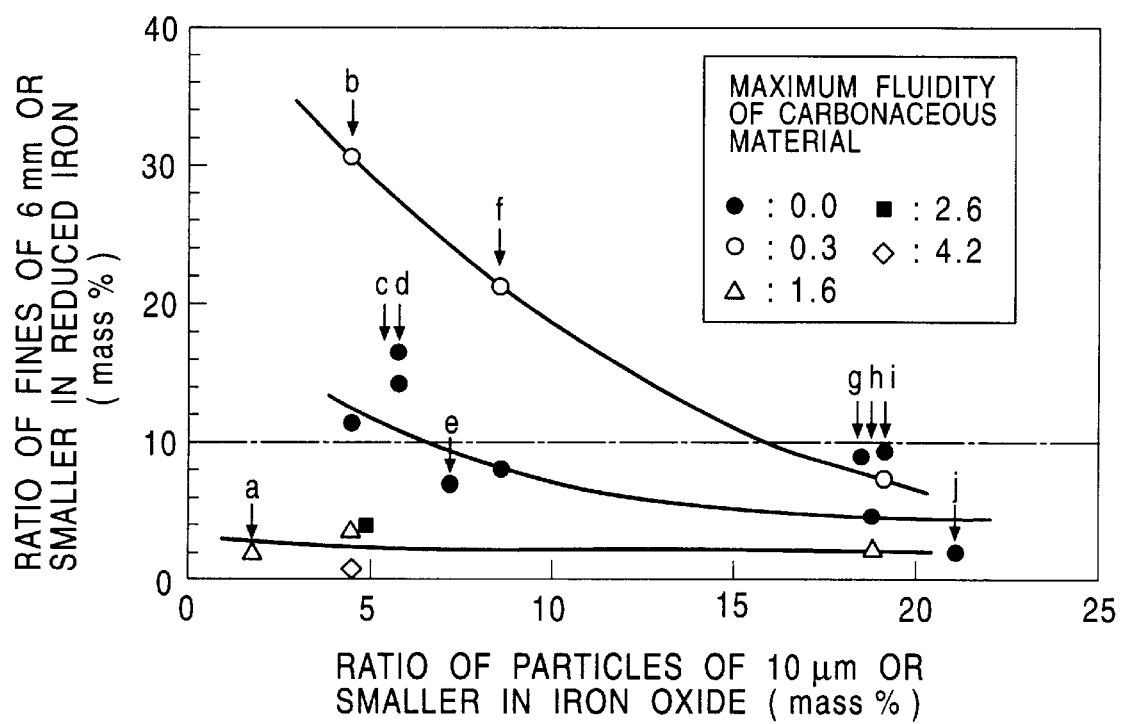
FIG. 2 is a graph showing the relation between the ratio of iron oxide particles of 10 $\mu$m or smaller in iron ore and the ratio of fines of 6 mm or smaller in reduced iron with each fluidity of a carbonaceous material in softening and melting in Example 1.

More specifically, predetermined amounts of iron ore, carbonaceous material, and binder were taken out of respective raw material tanks, and then mixed by a raw material mixer. Then, water was added to the resultant mixture, followed by pelletization using a pelletizer. After pelletization, the pellets were passed through a drier to produce the pellets incorporated with a carbonaceous material. The pellets incorporated with a carbonaceous material were reduced under heating by a rotary hearth furnace at 1300° C. for 9 minutes, and the fines ratio of reduced iron after reduction was measured. The results are shown in FIGS. 1 and 2.

FIG. 1 indicates that in the range of combinations of the maximum fluidity of the carbonaceous material and the ratio of iron oxide particles of 10 $\mu$m or smaller in iron ore above the line which connects in turn points A, B and C shown in FIG. 1, including the line, the ratio of fines of 6 mm or smaller of reduced iron is as low as less than 10% by mass (marked with o in the drawing). On the other hand, beyond the above range, the ratio of fines of 6 mm or smaller in reduced iron is 10% by mass or more (marked with x in the drawing). FIG. 2 indicates that the fines ratio of reduced iron decreases as the maximum fluidity of the carbonaceous material increases, and the fines ratio of reduced iron also decreases as the ratio of iron oxide particles of 10 $\mu$m or smaller in iron ore increases. This is due to the fact that an increase in the maximum fluidity of the carbonaceous material, and an increase in the ratio of iron oxide particles of 10 $\mu$m or smaller in iron ore contribute to improvement in strength of the pellets incorporated with a carbonaceous material.

TABLE 1

| Symbol | Type | Melting and softening property Maximum fluidity (logDDPM) | Chemical Composition (mass %) | | | |
|---|---|---|---|---|---|---|
| | | | Fixed carbon | Volatile matter | Ash | Sulfur |
| A | Jelinbah coal | 0.0 | 74.3 | 16.1 | 9.6 | 0.5 |
| B | Smoky River coal | 0.3 | 74.4 | 15.9 | 9.8 | 0.4 |
| C | B: 90 mass % F: 10 mass % | 0.4 | 74.2 | 16.1 | 9.8 | 0.4 |
| D | B: 60 mass % F: 40 mass % | 0.8 | 73.7 | 16.6 | 9.8 | 0.3 |
| E | Norwich coal | 1.2 | 72.2 | 17.3 | 10.5 | 0.5 |
| F | Yakut coal | 1.6 | 72.7 | 17.6 | 9.7 | 0.2 |
| G | Gregg River coal | 1.7 | 69.4 | 21.3 | 9.3 | 0.4 |
| H | Oak Grove coal | 2.6 | 72.4 | 18.7 | 8.9 | 0.5 |
| I | Blue Creek coal | 3.7 | 65.2 | 25.8 | 9.0 | 0.8 |
| J | AMCl coal | 4.2 | 57.4 | 35.0 | 7.5 | 0.9 |

TABLE 2

| Symbol | Type | | Particle size −10 $\mu$m (mass %) | Chemical Composition (mass %) | | | |
|---|---|---|---|---|---|---|---|
| | Brand | Remarks | | T. Fe | FeO | Gangue component | LD1 |
| a | MBR | Fine particles were removed from b | 1.7 | 67.9 | 0.2 | 1.7 | 0.7 |
| | | by a fluidized bed. | | | | | |
| b | MBR | Raw ore | 4.3 | 67.9 | 0.2 | 1.7 | 0.7 |
| c | MBR | b: 90 mass % g: 10 mass % | 5.7 | 67.9 | 0.2 | 1.7 | 0.7 |
| d | Carajas | Raw ore | 5.8 | 67.5 | 0.1 | 1.9 | 1.5 |
| e | MBR | b: 80 mass % g: 20 mass % | 7.2 | 67.9 | 0.2 | 1.7 | 0.7 |
| f | MBR | b: 70 mass % g: 30 mass % | 8.6 | 67.9 | 0.2 | 1.7 | 0.7 |
| g | MBR | b was wholly ground by a ball mill | 18.6 | 67.9 | 0.2 | 1.7 | 0.7 |
| h | Romeral | Raw ore | 19.0 | 69.5 | 30.2 | 2.7 | 0.4 |
| i | Samarco | Raw ore | 19.2 | 66.7 | 0.2 | 2.3 | 2.5 |
| j | Peru | Raw ore | 21.2 | 70.0 | 28.0 | 2.2 | 0.4 |

Example 2

Of the pellets incorporated with carbonaceous materials produced in Example 1, two types of pellets including a type (Comparative Example) in which the maximum fluidity of the carbonaceous material was 0.3, and the ratio of iron oxide particles of 10 $\mu$m or smaller in iron ore was 4% by mass, and a type (Example of this invention) in which the ratio of iron oxide particles of 10 $\mu$m or smaller in iron ore was 7% by mass, were reduced at a reduction temperature of 1300° C., and the reduction time and the fines ratio of reduced iron were measured. The results are shown in FIG. 3.

Figure 3:
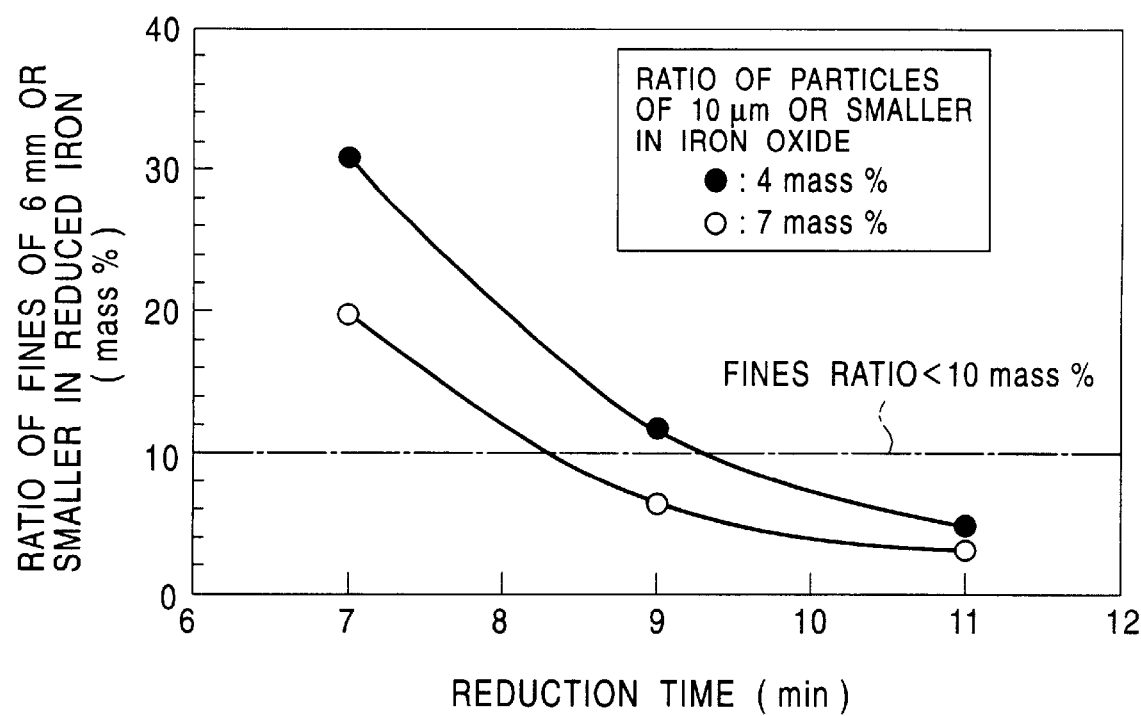
FIG. 3 is a graph showing the relation between the reduction time and the ratio of fines of 6 mm or smaller in reduced iron with a reduction temperature of 1300° C. in Example 2.

FIG. 3 indicates that when the ratio of iron oxide particles of 10 $\mu$m or smaller in iron ore is 4% by mass, in order that the ratio of fines of 6 mm or smaller in reduced iron is 10% by mass or less, a reduction time of 9.2 minutes is required for promoting sintering of the metallized particles after reduction. On the other hand, when the ratio of iron oxide particles of 10 $\mu$m or smaller in iron ore is 7% by mass, a reduction time of 8.3 minutes are required for attaining the same fines ratio as the above. In this way, an increase in the ratio of iron oxide particles of 10 $\mu$m or smaller in iron ore improves the strength of reduced iron, and shortens the holding time in a reducing furnace required for sintering, thereby shortening the reduction time. Therefore, comparison between both types of pellets reveals that productivity of the example of this invention is improved by about 10% as compared with the comparative example.

What is claimed is:

1. Pellets incorporated with a carbonaceous material, comprising
   a carbonaceous material and iron ore comprising iron oxide,
   wherein a maximum fluidity of the carbonaceous material in softening and melting, and a percentage of iron oxide particles of 10 μm or smaller in the iron ore, are within a range above a line which connects points A, B and C shown in FIG. 1, including the line.

2. Pellets incorporated with a carbonaceous material according to claim 1, wherein the carbonaceous material is a single material or a mixture of a plurality of materials.

3. Pellets incorporated with a carbonaceous material according to claim 1, wherein the iron ore is a single material or a mixture of a plurality of materials.

4. Pellets incorporated with a carbonaceous material according to claim 2, wherein the iron ore is a single material or a mixture of a plurality of materials.

5. A method of producing reduced iron, the method comprising heating and reducing the pellets incorporated with a carbonaceous material of claim 1.

6. A method of producing reduced iron, the method comprising heating and reducing the pellets incorporated with a carbonaceous material of claim 2.

7. A method of producing reduced iron, the method comprising heating and reducing the pellets incorporated with a carbonaceous material of claim 3.

8. A method of producing reduced iron, the method comprising heating and reducing the pellets incorporated with a carbonaceous material of claim 4.

9. Pellets incorporated with a carbonaceous material, comprising a carbonaceous material and iron ore comprising iron oxide, wherein combinations of the maximum fluidity of the carbonaceous material in softening and melting, and the percentage of iron oxide particles of 10 μm or smaller in the iron ore, are within a range above a line which connects in turn points A, B and C shown in FIG. 1, including the line; and wherein point A is a point where the maximum fluidity is 0, and the percentage of iron oxide particles of 10 μm or smaller in the iron ore is 15% by mass, point B is a point where the maximum fluidity is 0.5, and the percentage of iron oxide particles of 10 μm or smaller in the iron ore is 1% by mass, and point C is a point where the maximum fluidity is 5, and the percentage of iron oxide particles of 10 μm or smaller in the iron ore is 1% by mass.

10. Pellets incorporated with a carbonaceous material, comprising a carbonaceous material and iron oxide, wherein a maximum fluidity of the carbonaceous material in softening and melting, and a percentage of iron oxide particles of 10 μm or smaller in the iron oxide, are within a range above a line which connects points A, B and C shown in FIG. 1, including the line.

* * * * *